United States Patent
Ikeda et al.

(10) Patent No.: US 7,072,655 B2
(45) Date of Patent: Jul. 4, 2006

(54) MOBILE COMMUNICATION SYSTEM AND METHOD FOR CONTROLLING RECEIVING QUALITY

(75) Inventors: Takehiro Ikeda, Kanagawa (JP); Ichiro Okajima, Kanagawa (JP); Narumi Umeda, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 448 days.

(21) Appl. No.: 10/054,741

(22) Filed: Nov. 13, 2001

(65) Prior Publication Data

US 2002/0098838 A1 Jul. 25, 2002

(30) Foreign Application Priority Data

Nov. 14, 2000 (JP) .............................. 2000-347124

(51) Int. Cl.
*H04Q 7/20* (2006.01)
(52) U.S. Cl. ...................... 455/436; 455/437; 455/439; 455/423; 455/522
(58) Field of Classification Search ................ 455/436, 455/422, 437, 439, 440, 522, 422.1, 524, 455/423
See application file for complete search history.

(56) References Cited

U.S. PATENT DOCUMENTS

| | | | | |
|---|---|---|---|---|
| 5,267,261 | A * | 11/1993 | Blakeney et al. | 455/437 |
| 5,483,668 | A * | 1/1996 | Malkamaki et al. | 455/442 |
| 5,781,861 | A * | 7/1998 | Kang et al. | 455/442 |
| 6,259,927 | B1 * | 7/2001 | Butovitsch et al. | 455/522 |
| 6,289,220 | B1 * | 9/2001 | Spear | 455/436 |
| 6,438,377 | B1 * | 8/2002 | Savolainen | 455/439 |
| 6,553,016 | B1 * | 4/2003 | Roxbergh | 455/442 |
| 6,633,762 | B1 * | 10/2003 | Rauscher | 455/437 |

FOREIGN PATENT DOCUMENTS

| | | |
|---|---|---|
| CN | 1166760 A | 12/1997 |
| CN | 1236278 A | 11/1999 |
| EP | 0645940 A1 | 9/1994 |
| EP | 0809365 A1 | 11/1997 |
| EP | 0940938 A1 | 9/1999 |
| EP | 1032237 A1 | 8/2000 |
| JP | 08-172390 | 7/1996 |
| JP | 09-312871 | 12/1997 |

(Continued)

OTHER PUBLICATIONS

Official Notice of Rejection Patent Application No.: 2000-347124 Case No.: DCMH120217.

(Continued)

*Primary Examiner*—Joseph Feild
*Assistant Examiner*—Huy D. Nguyen
(74) *Attorney, Agent, or Firm*—Workman Nydegger

(57) ABSTRACT

The present invention improves receiving quality compared to the prior art even if instantaneous control of transmission power is not executed. A mobile station MS#0 measures signal level received from surrounding base stations and determines to which base stations it is to be connected in order to satisfy a desired downlink receiving quality (step S1). The mobile station MS#0 notifies a radio network control station RNC of the desired based stations to which the mobile station is to be connected (step S2). Upon receiving the notification from the mobile station MS#0, the radio network control station RNC duplicates a downlink transmitted signal for the mobile station MS#0, if any, and transmits it to the selected base stations (step S3). The mobile station MS#0 receives signals transmitted by the base stations (step S4) and synthesizes these signals (step 5), thereby satisfying the desired downlink receiving quality.

7 Claims, 11 Drawing Sheets

FOREIGN PATENT DOCUMENTS

| | | |
|---|---|---|
| JP | 10-290475 | 10/1998 |
| JP | 11-341541 | 12/1999 |
| JP | 2000-197092 | 7/2000 |
| JP | 2000-217138 | 8/2000 |
| WO | WO96/08119 | 3/1996 |
| WO | WO99/09660 | 2/1999 |

OTHER PUBLICATIONS

Official Notice of Rejection: Case No.: DCMH120217, Patent Application No.:2000-347124.

* cited by examiner

| RNC ADDRESS | CONNECTION REQUEST COMMAND | MOBILE STATION ADDRESS | INFORMATION ON DESIRED BASE STATIONS TO WHICH MOBILE STATION IS TO BE CONNECTED |
|---|---|---|---|

| QoS AGENT ADDRESS | CONNECTION REQUEST COMMAND | MOBILE STATION ADDRESS | DESIRED DOWNLINK RECEIVING QUALITY | INFORMATION ON LOCATION OF MOBILE STATION |
|---|---|---|---|---|

FIG.5B

| RNC ADDRESS | CONNECTION REQUEST COMMAND | MOBILE STATION ADDRESS | INFORMATION ON DESIRED BASE STATIONS TO WHICH MOBILE STATION IS TO BE CONNECTED |
|---|---|---|---|

| LOCATION OF MOBILE STATION | RECEIVING QUALITY | CONNECTED BASE STATIONS |
|---|---|---|
| XXXXXXXX | XXXX | BS#XX,BS#XX,BS#XX |
| ⋮ | ⋮ | ⋮ |

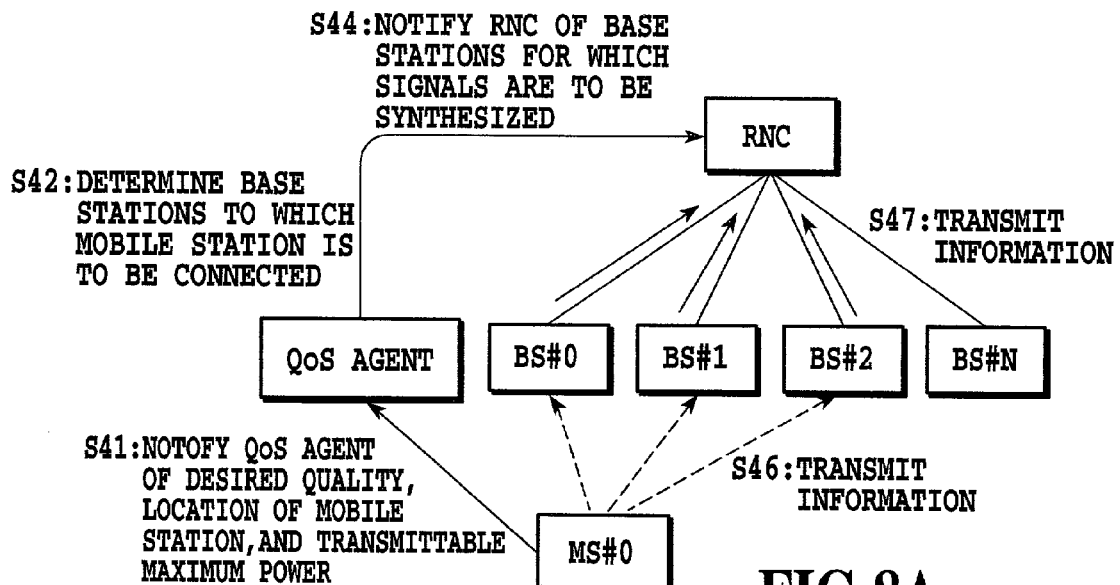
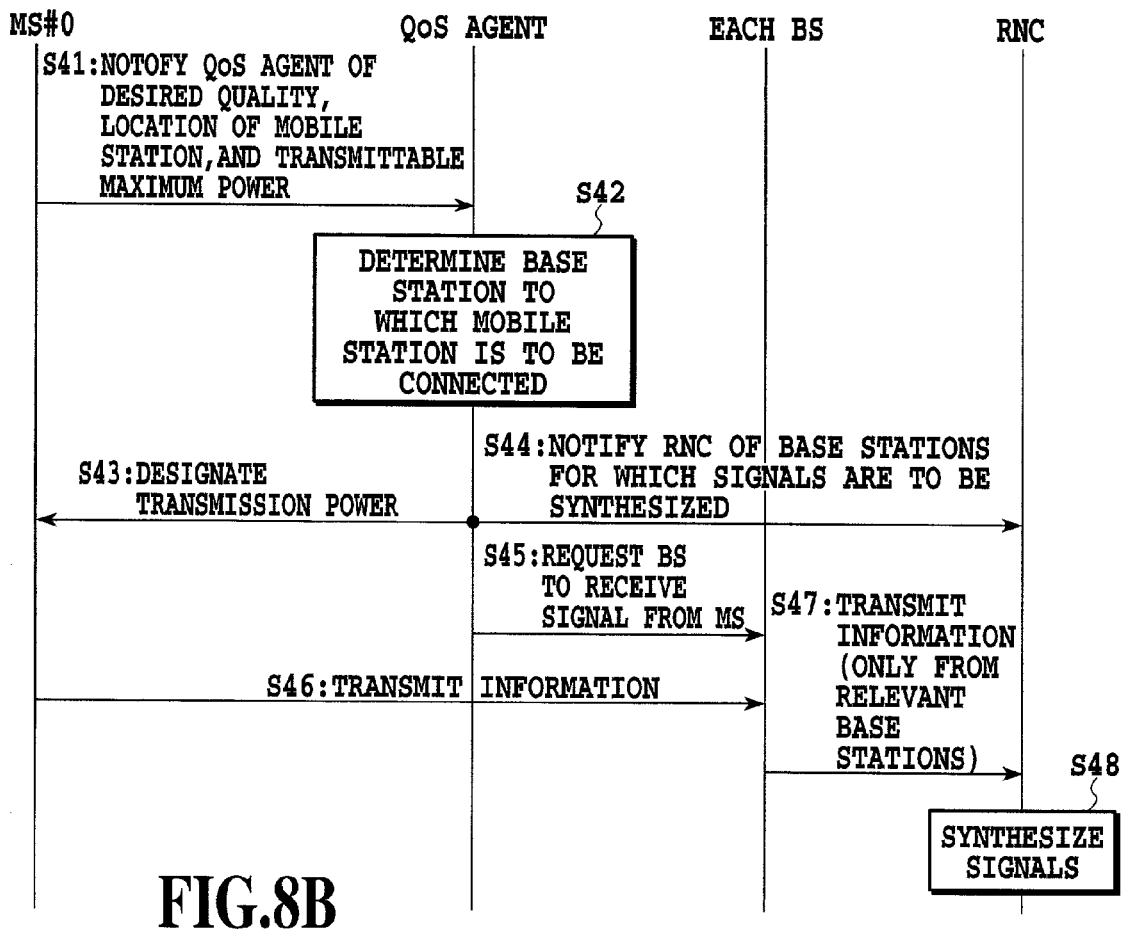

FIG.9A

| QoS AGENT ADDRESS | CONNECTION REQUEST COMMAND | MOBILE STATION ADDRESS | DESIRED UPLINK QUALITY | TRANSMITTABLE MAXIMUM POWER | INFORMATION ON LOCATION OF MOBILE STATION |
|---|---|---|---|---|---|

FIG.9B

| MOBILE STATION ADDRESS | TRANSMISSION POWER DESIGNATION COMMAND | TRANSMISSION POWER |
|---|---|---|

FIG.9C

| RNC ADDRESS | SIGNAL SYNTHESIS REQUEST COMMAND | MOBILE STATION ADDRESS | INFORMATION ON BASE STATIONS TO WHICH MOBILE STATION IS TO BE CONNECTED |
|---|---|---|---|

FIG.9D

| BASE STATION ADDRESS | RECEPTION REQUEST COMMAND | SOURCE MOBILE STATION ADDRESS |
|---|---|---|

| RNC ADDRESS | DUPLICATE REQUEST COMMAND | DUPLICATE BASE STATION ADDRESS | DESTINATION MOBILE STATION ADDRESS |

FIG.11

MOBILE COMMUNICATION SYSTEM AND METHOD FOR CONTROLLING RECEIVING QUALITY

This application claims priority under 35 U.S.C. 119 to Patent Application No. 2000-347124 filed Nov. 14, 2000 in Japan, the content of which is incorporated hereinto by reference.

BACKGROUND OF THE INVENTION

1. Filed of the Invention

The present invention relates to a mobile communication system and a method for controlling receiving quality in the mobile communication system. More specifically, the present invention relates to a mobile communication system that provides communication services from a base station to a mobile station via a radio channel and a method for controlling receiving quality in the mobile communication system.

2. Description of the Related Art

In a known mobile communication system, a desired receiving quality is achieved mainly by controlling transmission power to compensate for an instantaneous variation in received signal level.

FIGS. 1A to 1C show problems with receiving quality control using conventional transmission power control. It is assumed that the receiving range varies over a wide range as shown in FIG. 1A. In this case, if the transmission power is controlled by a small step size (see FIG. 1B), transmission power control cannot follow rapid variations in receiving level. On the other hand, if the transmission power is controlled by a large step size (see FIG. 1C), transmission power control cannot accurately follow variations in receiving level.

To solve the conventional problems described with reference to FIGS. 1A to 1C, the transmission power control based on a small step size must be executed at a very short control period. In this case, a new problem occurs; the overhead of a control signal for the transmission power control may reduce transmission efficiency.

In particular, it is known that the level of received signals in a mobile communication system varies very dynamically. To compensate for such received signals, the transmission power must be controlled over a wide dynamic range. Consequently, it is difficult to apply an efficient power amplifier.

SUMMARY OF THE INVENTION

It is thus an object of the present invention to provide a mobile communication system that is adapted, in view of the above-described points, to improve the receiving quality compared to the prior art even if the instantaneous control of transmission power is not provided, as well as a method for controlling receiving quality in the mobile communication system.

To attain this object, the present invention increases or reduces the number of base stations to simultaneously connect to a mobile station so as to realize a certain level of receiving quality control even if instantaneous control of transmission power is not executed, on the basis of the fact that when a plurality of received signals are synthesized, a variation in the level of the received signals decreases.

That is, to attain the above object, a first aspect of the present invention provides a mobile communication system comprising a plurality of base stations and a network control station conceptually located above the plurality of base stations, the network control station duplicating and/or synthesizing information in order to allow a mobile station to simultaneously communicate with at least two base stations.

The mobile station comprises means for determining, upon receiving signals from the plurality of base stations, to which base stations the mobile station is to be connected in order to satisfy a downlink receiving quality desired by the mobile station and notifying the network control station of the desired base stations to which the mobile station is to be connected. The network control station has means for transmitting a duplicated information signal to the base stations. Thus, the mobile station controls the downlink receiving quality by receiving and synthesizing signals transmitted by the plurality of base stations.

A second aspect of the present invention provides a mobile communication system comprising a plurality of base stations, a network control station conceptually located above the plurality of base stations, the network control station duplicating and/or synthesizing information in order to allow a mobile station to simultaneously communicate with at least two base stations, and quality control means having a function of managing receiving quality of a mobile station present within a service area and a function of measuring traffic in each cell within the service area, the quality control means notifying the network control station of base stations with which the mobile station is to communicate simultaneously.

The mobile station has means for registering, in the quality control means, the downlink receiving quality desired by the mobile station and the location of the mobile station. The quality control means determines to which base stations the mobile station is to be connected in order to satisfy the receiving quality and notifies the network control station of these base stations. The network control station transmits duplicated information signal to the base stations. Furthermore, the mobile station receives and synthesizes signals transmitted by the plurality of base stations to control the downlink receiving quality.

Further, the mobile station has means for notifying, before transmitting information, the quality control means of a desired uplink receiving quality received by base stations and/or a transmittable maximum power of the mobile station and/or the location of the mobile station. The quality control means has means for identifying base stations to which the mobile station is to be connected in order to satisfy quality in such a manner that the transmittable maximum power of the mobile station is not exceeded and means for requesting the base stations and the network control station to receive and synthesize a signal from the mobile station and designating transmission power that is to be used by the mobile station. The mobile station transmits information using the designated transmission power, and the network control section synthesizes signals received by the base stations to control the uplink receiving quality.

The quality control means has means for measuring traffic in cells surrounding a cell in which the mobile station is present and means for requesting the network control station to transmit a duplicate signal to one or more stations, if any, which have a lower measured traffic and which can transmit information to the mobile station communicating in an adjacent cell. The mobile station receives and synthesizes signals from base stations that have been communicating with the mobile station and from the one or more base stations, thereby improving the downlink receiving quality.

A third aspect of the present invention provides a receiving quality control method for a mobile communication system having a plurality of base stations within a service area wherein a network control station duplicates and/or synthesizes information in order to allow a mobile station to simultaneously communicate with at least two base stations.

The mobile station comprises means for determining, upon receiving signals from the plurality of base stations, to which base stations the mobile station is to be connected in order to satisfy a downlink receiving quality desired by the mobile station and notifying the network control station of the desired base stations to which the mobile station is to be connected. The network control station has means for transmitting a duplicated information signal to the base stations. Thus, the mobile station controls the downlink receiving quality by receiving and synthesizing signals transmitted by the plurality of base stations.

A fourth aspect of the present invention provides a receiving quality control method for a mobile communication system having a plurality of base stations within a service area wherein when a network control station duplicates and/or synthesizes information in order to allow a mobile station to simultaneously communicate with at least two base stations, the network control station is notified of the base stations with which the mobile station is to communicate simultaneously using quality control means having a function of managing receiving quality of a mobile station present within the service area and a function of measuring traffic in each cell within the service.

The mobile station registers, in the quality control means, the downlink receiving quality desired by the mobile station and the location of the mobile station. The quality control means determines to which base stations the mobile station is to be connected in order to satisfy the receiving quality, and notifies the network control station of these base stations. The network control station transmits duplicated information signal to the base stations. The mobile station receives and synthesizes signals transmitted by the plurality of base stations to control the downlink receiving quality.

Further, before transmitting information, the mobile station notifies the quality control means of a desired uplink receiving quality received by base stations and/or a transmittable maximum power of the mobile station and/or the location of the mobile station. The quality control means identifies base stations to which the mobile station is to be connected in order to satisfy quality in such a manner that the transmittable maximum power of the mobile station is not exceeded, requests the base stations and the network control station to receive and synthesize a signal from the mobile station, and designates transmission power that is to be used by the mobile station. The mobile station transmits information using the designated transmission power, and the network control section synthesizes signals received by the base stations to control the uplink receiving quality.

The quality control means measures traffic in cells surrounding a cell in which the mobile station is present, and requests the network control station to transmit a duplicate signal to one or more base stations, if any, which have a lower measured traffic and which can transmit information to the mobile station communicating in an adjacent cell. The mobile station receives and synthesizes signals from base stations that have been communicating with the mobile station and from the one or more base stations, thereby improving the downlink receiving quality.

A fifth aspect of the present invention provides a recording medium having a receiving quality control program for a mobile communication system recorded therein, the mobile communication system having a plurality of base stations within a service area, the program allowing execution of a step of causing a network control station to duplicate and/or synthesize information in order to allow a mobile station to simultaneously communicate with at least two base stations.

A sixth aspect of the present invention provides a recording medium having a receiving quality control program for a mobile communication system recorded therein, the mobile communication system having a plurality of base stations within a service area, wherein when a network control station duplicates and/or synthesizes information in order to allow a mobile station to simultaneously communicate with at least two base stations, the program causes a computer to execute a step of notifying the network control station of the base stations with which the mobile station is to communicate simultaneously using quality control means having a function of managing receiving quality of a mobile station present within the service area and/or a function of measuring traffic in each cell within the service.

According to the present invention, even if instantaneous control of transmission power is not executed, the receiving quality can be improved compared to the prior art. In other words, the present invention increases or reduces the number of base stations to simultaneously connect to a mobile station so as to realize a certain level of receiving quality control even if instantaneous control of transmission power is not executed, on the basis of the fact that when a plurality of received signals are synthesized, a variation in the level of the received signals decreases.

The above and other objects, effects, features and advantages of the present invention will become more apparent from the following description of embodiments thereof taken in conjunction with the accompanying drawings.

BRIEF DESCRIPTION OF THE DRAWINGS

FIG. 3 is a diagram showing the signal format used in Embodiment 1;

FIGS. 5A and 5B is a diagram showing the signal format used in Embodiment 2;

FIG. 8A is a diagram showing a mobile communication system for implementing receiving quality control for an uplink;

FIG. 8B is a sequence diagram showing the flow of communication control in Embodiment 3;

FIGS. 9A to 9D are diagrams showing the signal format used in Embodiment 3;

FIG. 11 is a diagram showing the signal format used in Embodiment 4.

DESCRIPTION OF THE PREFERRED EMBODIMENTS

Embodiments will be described below in detail with reference to FIGS. 2A to 11.

[Embodiment 1]

Figure 1A:
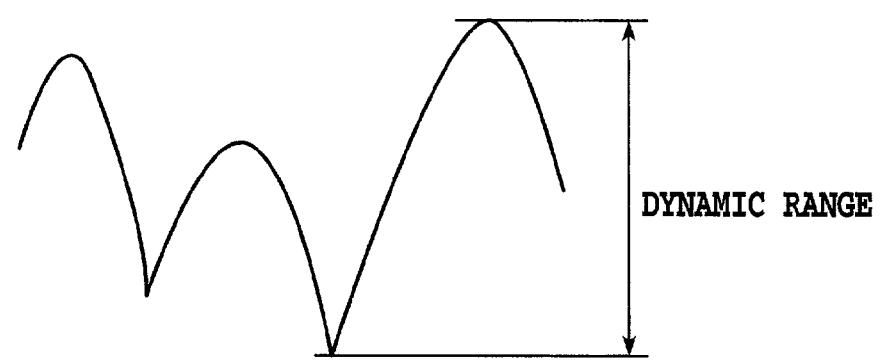
FIGS. 1A to 1C are diagrams illustrating problems with receiving quality control using conventional transmission power control.
Figure 1B:
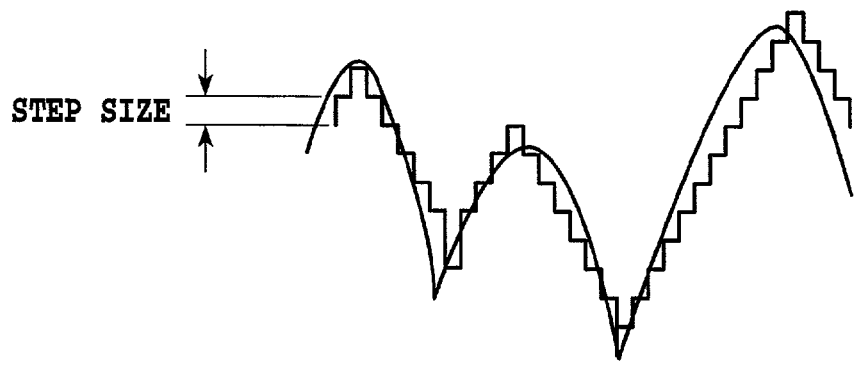
Figure 1C:
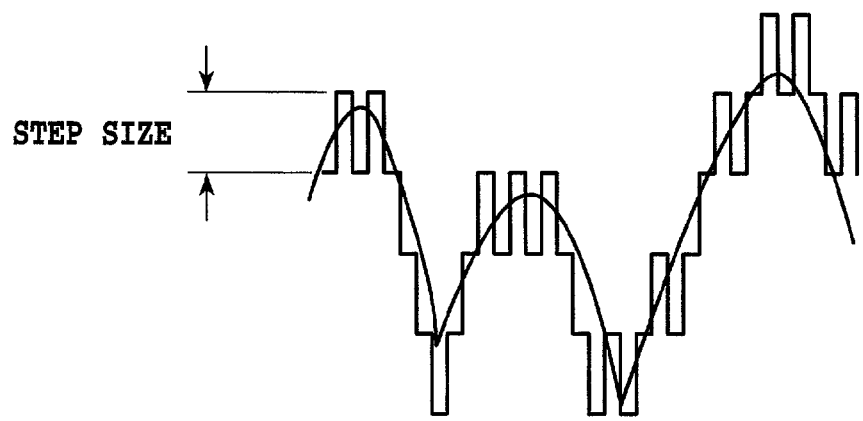
Figure 2A:
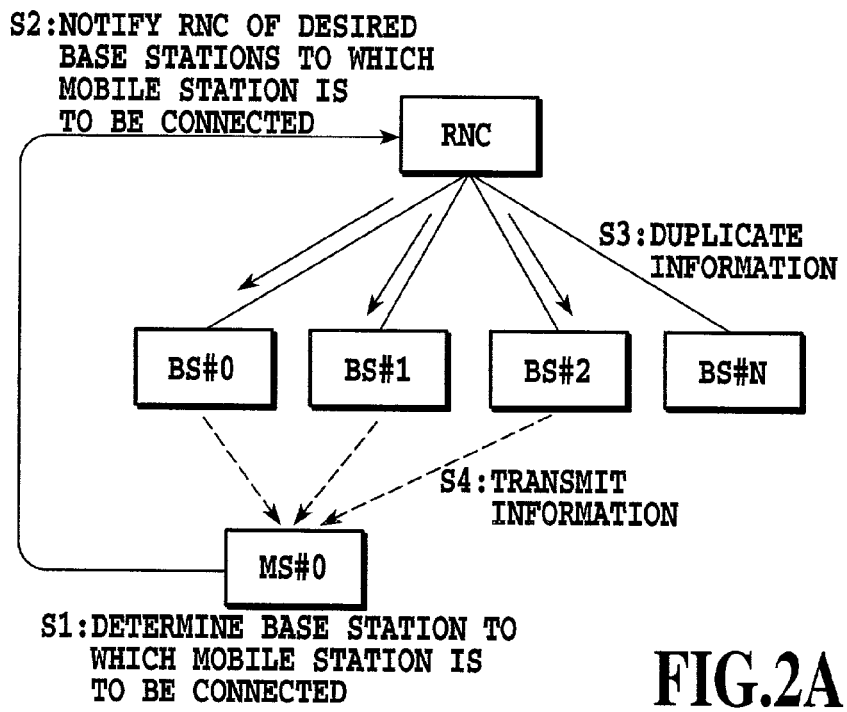
FIG. 2A is a diagram showing a mobile communication system for implementing receiving quality control for a downlink.
Figure 2B:
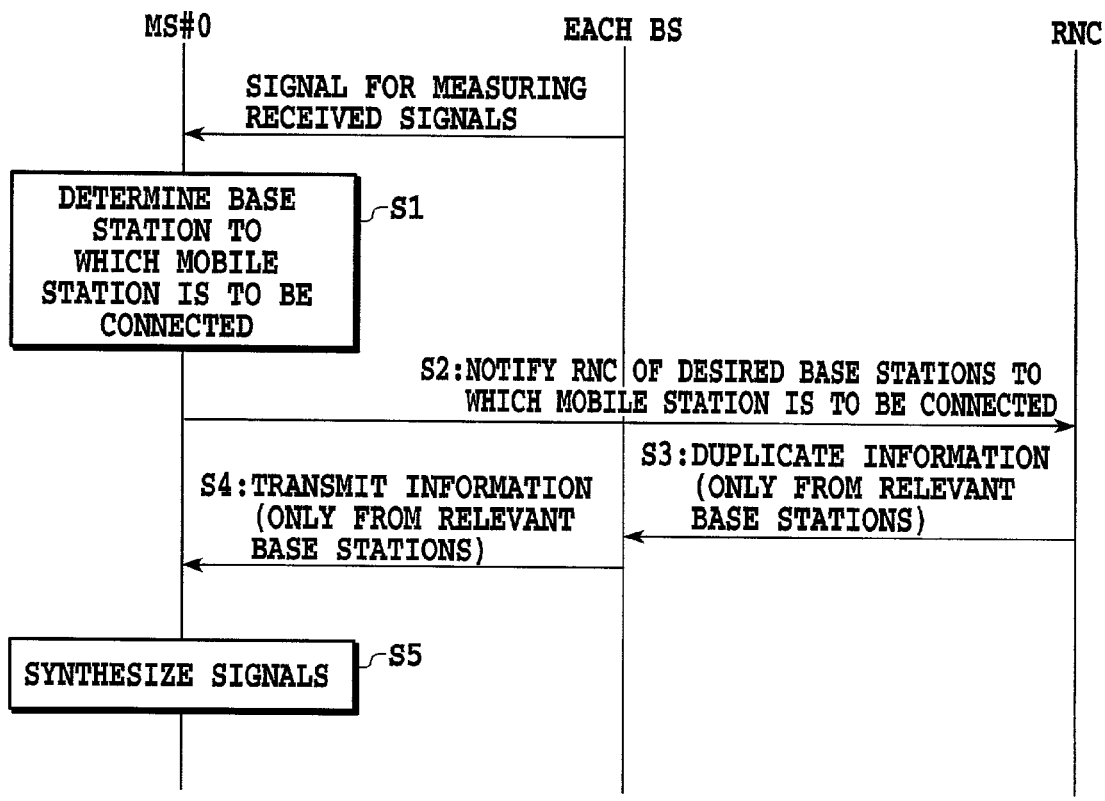
FIG. 2B is a sequence diagram showing the flow of communication control in Embodiment 1.

FIG. 2A shows a mobile communication system for implementing receiving quality control for a downlink. In this figure, reference characters RNC, BS, and MS denote a radio network controller, a base station, and a mobile station, respectively. More specifically, FIG. 2A shows how the base station BS (including base stations #0 to #N), the mobile station MS#0, and the radio network control station RNC are connected together according to Embodiment 1, and FIG. 2B shows the flow of communication control according to Embodiment 1.

In Embodiment 1, the mobile station MS#0 measures power received from surrounding base stations to determine to which base stations it is to be connected in order to satisfy a desired downlink receiving quality (step S1).

The mobile station MS#0 notifies the radio network control station RNC of the desired base stations to which it is to be connected, using the signal format shown in FIG. 3 (step S2). FIG. 3 shows the signal format used by the mobile station MS#0 to notify the radio network control station RNC (=signal indicative of information on desired base stations to which the mobile station is to be connected). This signal format includes an RNC address, a connection request command, a mobile station address, and information on desired bas stations to connect.

Upon receiving the notification from the mobile station MS#0, the radio network control station RNC duplicates a downlink transmitted signal for the mobile station MS#0, if any, and transmits it to the selected base stations (step S3). In Embodiment 1, shown in FIG. 2A, the signal is transmitted to three base stations BS#0, #1, and #2.

The mobile station MS#0 receives signals transmitted by the base stations (step S4) and synthesizes these signals (step 5), thereby satisfying the desired downlink receiving quality.

In Embodiment 1, the mobile station MS#0 satisfies the desired quality by synthesizing the signals received from the base stations BS#0, #1, and #2, but of course the present invention is not limited to this example.

[Embodiment 2]

Figure 4A:
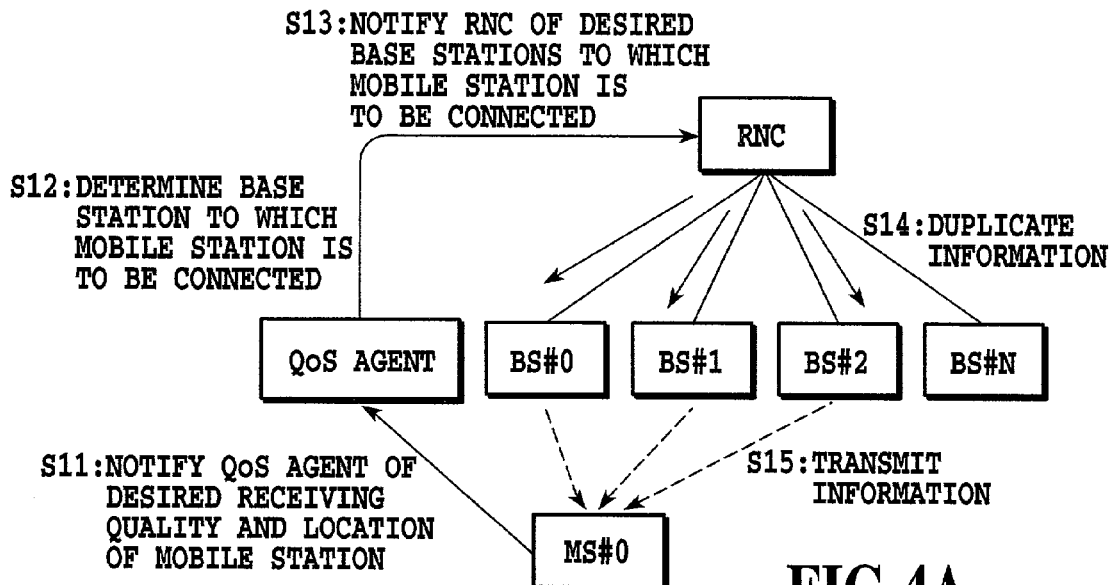
FIG. 4A is a diagram showing another mobile communication system for implementing receiving quality control for the downlink.
Figure 4B:
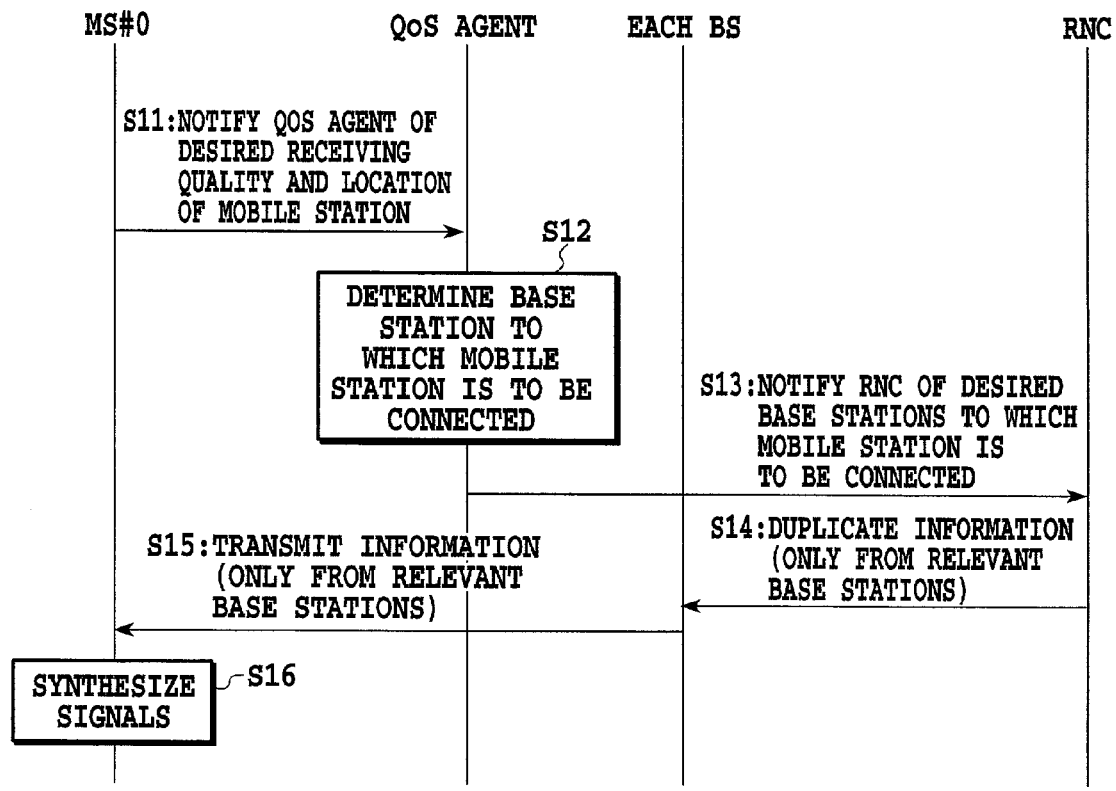
FIG. 4B is a sequence diagram showing the flow of communication control in Embodiment 2.

FIG. 4A shows another mobile communication system for implementing receiving quality control for the downlink. This system comprises a QoS (Quality of Service) agent in addition to the radio network control station RNC, the base station BS, and the mobile station MS. More specifically, FIG. 4A shows how the base station BS (including base stations #0 to #N), the mobile station MS#0, the radio network control station RNC, and the QoS agent are connected together according to Embodiment 2, and FIG. 4B shows the flow of communication control according to Embodiment 2.

In Embodiment 2, the mobile station MS#0 notifies the QoS agent of a downlink receiving quality desired thereby and the location thereof, using the signal format shown in FIG. 5A (step S11). FIG. 5A shows the signal format used by the mobile station MS#0 to notify the QoS agent (=signal indicative of a desired receiving quality and information on the location of the mobile station). This signal format includes a QoS agent address, a connection request command, a mobile station address, a desired downlink receiving quality, and information on the location of the mobile station.

The QoS agent determines to which base stations the mobile station is to be connected in order to satisfy the quality desired by the mobile station MS#0 (step S12), and requests the radio network control station RNC to duplicate and transmit a signal to the mobile station MS#0 using the signal format shown in FIG. 5B (step S13). FIG. 5B shows the signal format used by the QoS agent to notify the radio network control station RNC (=signal indicative of information on desired base stations to which the mobile station is to be connected). This signal format includes an RNC address, a connection request command, a mobile station address, and information on desired bas stations to connect.

Figure 6:
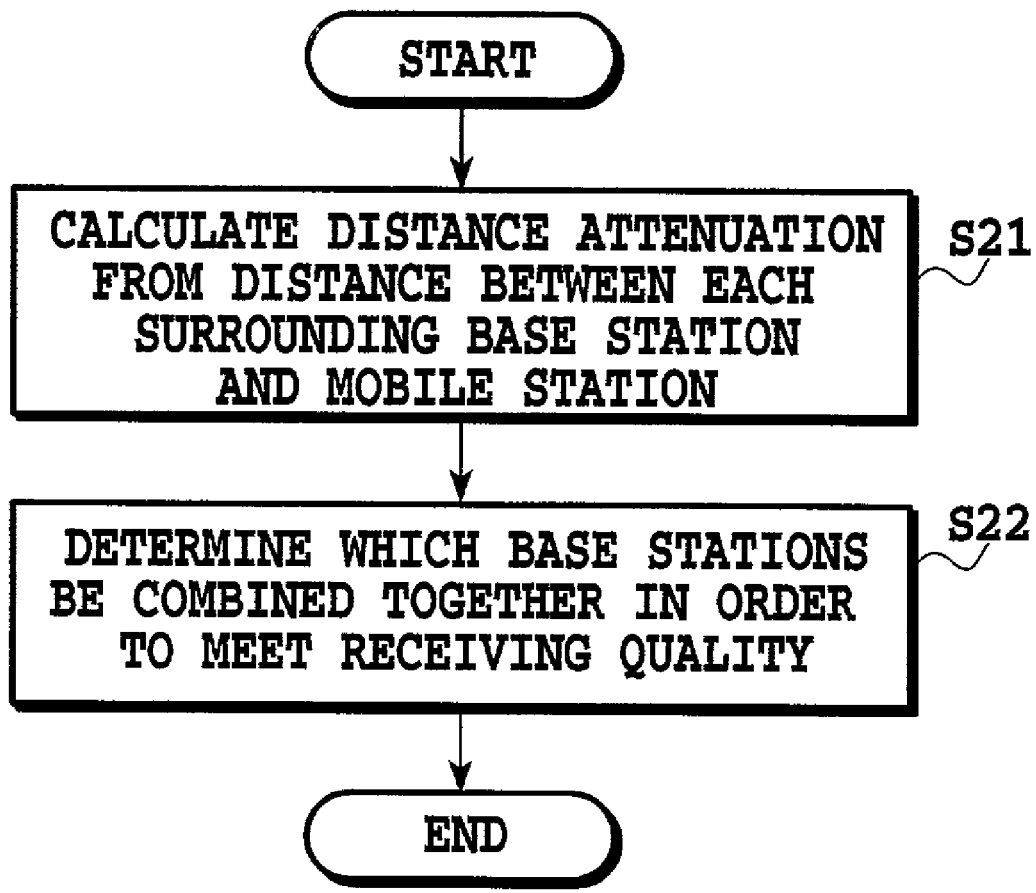
FIG. 6 is a chart illustrating a method by which a QoS agent selects base stations to which the mobile station is to be connected (using the locations of the base station and a mobile station)
Figures 7A, 7B:
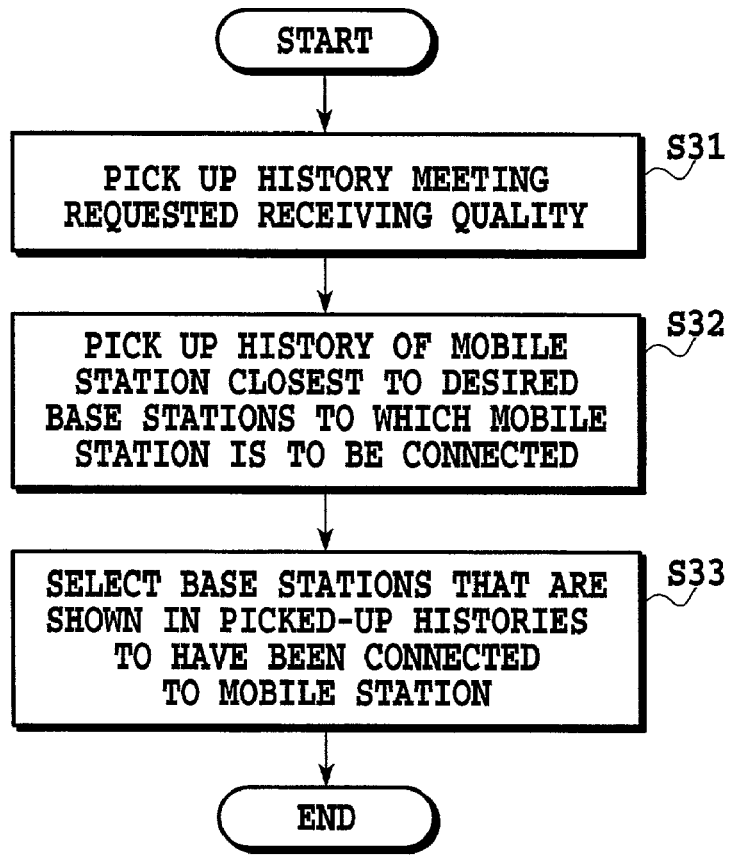
FIG. 7A is a chart showing a past connection status history possessed by the QoS agent.
FIG. 7B is a chart illustrating a method by which the QoS agent selects base stations to which the mobile station is to be connected (using the past history)

In this case, the QoS agent selects base stations to which the mobile station is to be connected by calculating the attenuation of a signal on the basis of the locations of the surrounding base stations and the mobile station as shown in FIG. 6, referencing the past connection history of the mobile station as shown in FIG. 7B, or combining together the methods shown in FIGS. 6 and 7B.

In FIG. 6, at step S21, a distance attenuation is calculated on the basis of the distance between each surrounding base station and the mobile station. At step S22, it is determined which base stations be combined together in order to satisfy the receiving quality.

FIG. 7A illustrates a past connection status history possessed by the QoS agent. The QoS agent stores the correspondences between the locations of mobile stations and receiving qualities and base stations to which the mobile station is to be connected, as tables. In FIG. 7B, at step S31, a history that satisfies the desired receiving quality is picked up. At step S32, the history of a mobile station located closest to desired base stations to which the mobile station is to be connected is picked up. At step S33, base stations which are shown in the picked-up histories to have been connected to the mobile station are selected.

Referring back to FIG. 4B, the radio network control station RNC duplicates a downlink transmitted signal, if any, and transmits it to the selected base stations (step S14).

The mobile station MS#0 receives and synthesizes signals transmitted by the base stations (step S15), thereby satisfying the desired downlink receiving quality.

In Embodiment 2, the mobile station MS#0 satisfies the desired quality by receiving and synthesizing the signals received from the base stations BS#0, #1, and #2, but of course the present invention is not limited to this example.

[Embodiment 3]

FIG. 8A shows a mobile communication system for implementing receiving quality control for an uplink. This system comprises the radio network control station RNC, the base station BS, the mobile station MS, and the QoS agent. More specifically, FIG. 8A shows how the base station BS (including base stations #0 to #N), the mobile station MS#0, the radio network control station RNC, and the QoS agent are connected together according to Embodiment 3, and FIG. 8B shows the flow of communication control according to Embodiment 3.

In Embodiment 3, before transmitting information, the mobile station MS#0 transmits a desired uplink quality received by base stations and the location and transmittable maximum power of the mobile station, to the QoS agent using the signal format shown in FIG. 9A (step S41). The QoS agent selects base stations to which the mobile station is to be connected in order to satisfy this quality in such a way that the transmittable maximum power of the mobile station MS#0 is not exceeded (step S42), and notifies the mobile station of corresponding transmission power using the signal format shown in FIG. 9B (step S43). Further, the QoS agent requests the radio network control station RNC to synthesize a signal from the mobile station MS#0, using the signal format shown in FIG. 9C (step S44). Furthermore, the QoS agent requests each base station to receive a signal from the mobile station MS#0, using the signal format shown in FIG. 9D.

In Embodiment 3, base stations to which the mobile station is to be connected can be selected using the means in FIG. 6 or 7B, described above, or a combination of these methods.

The mobile station MS#0 transmits a signal using the designated transmission power (step S46), and the radio network control station RNC synthesizes the signals received by the base stations (steps S47 and S48), thereby realizing the desired uplink receiving quality.

FIG. 9A, described above, shows the signal format used by the mobile station MS#0 to notify the QoS agent (=signal indicative of a desired receiving quality, a transmittable maximum power, and information on the location of the mobile station). This signal format includes a QoS agent address, a connection request command, a mobile station address, a desired uplink receiving quality, a maximum transmission power, and information on the location of the mobile station. FIG. 9B shows the signal format used by the QoS agent to designate transmission power that is to be used by the mobile station MS#0. This signal format includes a mobile station address, a transmission power designation command, and transmission power. FIG. 9C shows the signal format used by the QoS agent to notify the radio network control station RNC (=signal requesting synthesis of signals). This signal format includes an RNC address, a signal synthesis request command, a mobile station address, and information from base station to be synthesized. FIG. 9D shows the format of a reception request signal transmitted to each base station by the QoS agent. This signal format includes the address of the base station, a reception request command, and a source mobile station address.

In Embodiment 3, the base stations BS#0, #1, and #2 each receive a signal from the mobile station MS#0, but of course the present invention is not limited to this example.

[Embodiment 4]

Figure 10A:
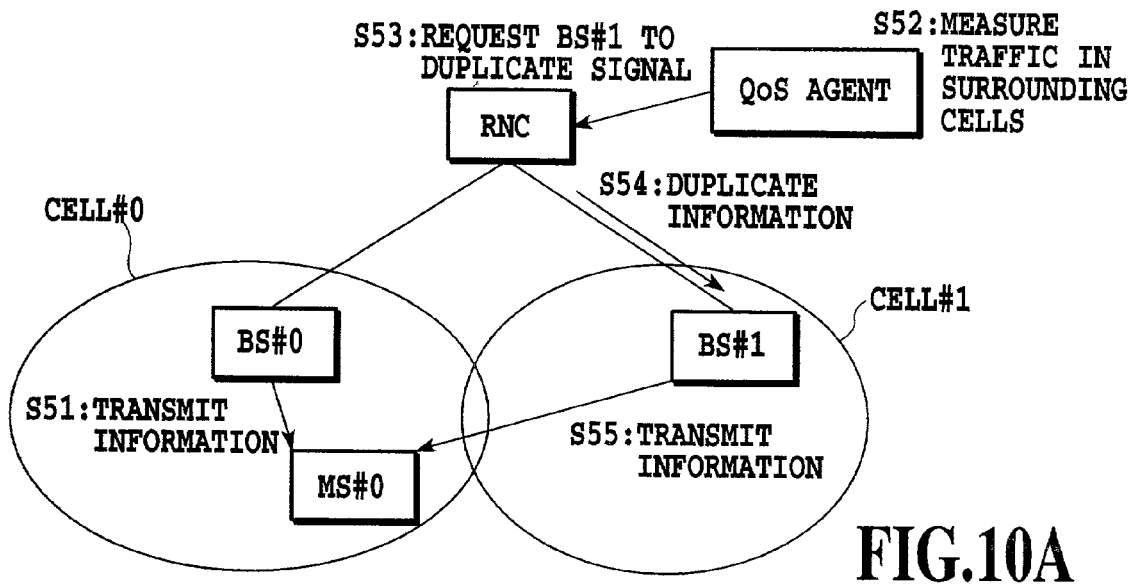
FIG. 10A is a diagram showing another mobile communication system for implementing receiving quality control for the downlink.
Figure 10B:
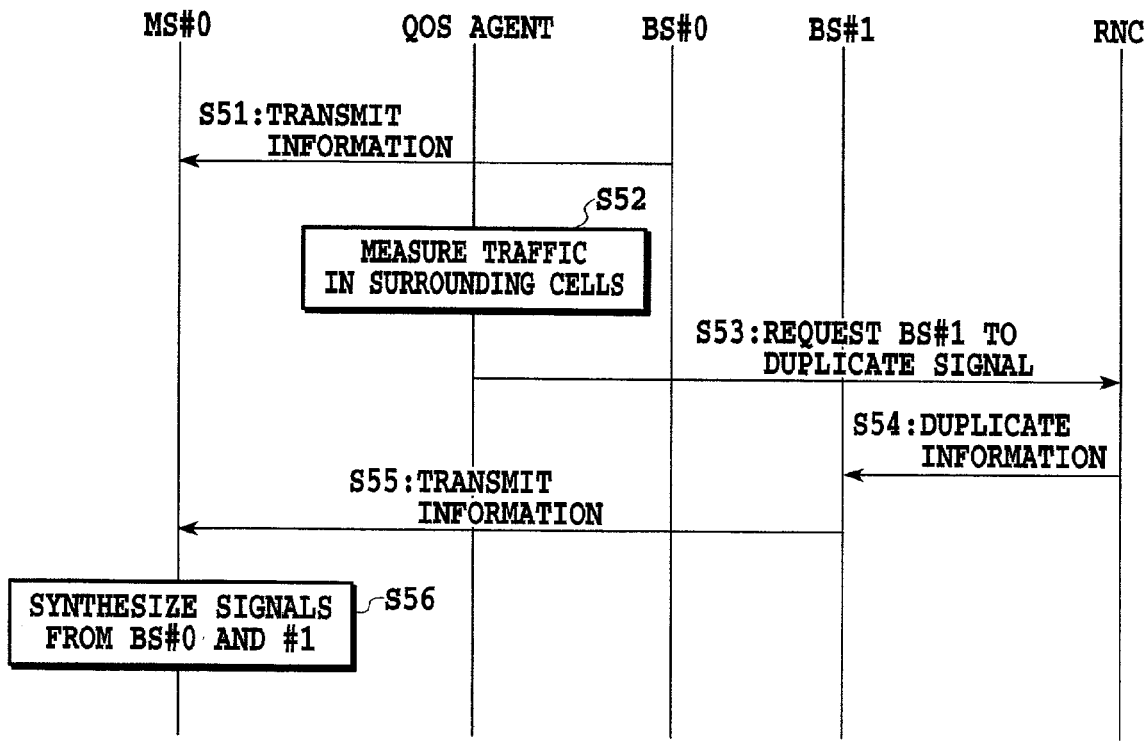
FIG. 10B is a sequence diagram showing the flow of communication control in Embodiment 4.

FIG. 10A shows another mobile communication system for implementing receiving quality control for the downlink. This system comprises the radio network control station RNC, the base station BS, the mobile station MS, and the QoS agent. More specifically, FIG. 10A shows how the base station BS (for simplification, the number of base stations is assumed to be two), the mobile station MS#0, the radio network control station RNC, and the QoS agent are connected together according to Embodiment 4, and FIG. 10B shows the flow of communication control according to Embodiment 4.

In Embodiment 4, it is assumed that at a certain time, the base station BS#0, constituting a cell #0, is communicating with the mobile station MS#0, which is present within the cell #0 (step S51). The QoS agent measures the traffic in adjacent cells (step S52) and determines that the cell #1 has a low traffic and that a signal can be transmitted to the mobile station MS#0 in the cell #0. The QoS agent requests the radio network control station RNC to duplicate information transmitted to the base station BS#1 (step S53, S54, and S55). As a result, the mobile station MS#0 can receive and synthesizes signals from both the base stations BS#0 and BS#1 (step S56). Thus, if the signal power transmitted by each base station is assumed to be fixed, the receiving quality of the mobile station is improved.

As shown in FIG. 11, the duplicate request signal transmitted to the radio network control station RNC by the QoS agent includes an RNC address, a duplicate request command, a duplicate base station address, and a destination mobile station address.

On the other hand, in Embodiment 4, if the object is to keep the receiving quality of the mobile station constant, the transmission power of each base station can be reduced, thereby reducing interference with other mobile stations simultaneously communicating within the cell.

[Other Embodiments]

It is needless to say that the object of the present invention can be accomplished by providing a system or an apparatus with a recording medium (storage medium) in which software program codes implementing the functions of the embodiments described previously are recorded so as to be readable by a computer, and causing a computer (or a CPU or an MPU) in the system or apparatus to read out the program codes stored in the recording medium and execute commands in accordance with the program codes. In this case, the program codes read out from the recording medium implement the functions of the embodiments described previously, and the recording medium having the program codes recorded therein constitutes the present invention. The recording medium having the program codes or variable data such as tables recorded therein may be, for example, a magnetic disk such as a floppy disk or a hard disk, any optical disk, any photo-magnetic disk, or any non-volatile memory card.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A mobile communication system including a plurality of base stations, a network control station conceptually located above said plurality of base stations and mobile stations receiving signals from said plurality of base stations, said mobile communication system characterized by comprising:

quality control means coupled to said network control station and communicating with the mobile stations;

wherein said mobile station notifies said quality control means of a downlink receiving quality desired by the mobile station and the location of the mobile station, said quality control means determines to which base stations the mobile station is to be connected in order to satisfy the downlink receiving quality desired by the mobile station and notifies said network control station of the desired base stations to which the mobile station is to be connected, said network control station transmits a duplicated information signal to said desired base stations in order to allow a mobile station to simultaneously communicate with at least two base stations, and said mobile station further receives and synthesizes signals transmitted by the plurality of base stations to control the downlink receiving quality.

2. The mobile communication system according to claim 1, characterized in that:

said mobile station notifies, before transmitting information, said quality control means of a desired uplink receiving quality received by base stations and/or a transmittable maximum power of the mobile station and/or the location of the mobile station, said quality control means has means for identifying base stations to which said mobile station is to be connected in order to satisfy the desired uplink receiving quality in such a manner that the transmittable maximum power of said mobile station is not exceeded and means for requesting the base stations and said network control station to receive and synthesize a signal from said mobile station and designating transmission power that is to be used by said mobile station, and said mobile station transmits information using said designated transmission power, and the network control section synthesizes signals received by the base stations to control the uplink receiving quality.

3. The mobile communication system according to claim 1, characterized in that:

said quality control means has means for measuring traffic in cells surrounding a cell in which said mobile station is present and means for requesting the network control station to transmit a duplicate signal to one or more stations, if any, which have a lower measured traffic and which can transmit information to said mobile station communicating in an adjacent cell, and said mobile station receives and synthesizes signals from base stations that have been communicating with the mobile station and from the one or more base stations, thereby improving the downlink receiving quality.

4. A receiving quality control method for a mobile communication system having a plurality of base stations, a network control station conceptually located above said plurality of base stations and mobile stations receiving signals from said plurality of base stations, the method being characterized in that:

said mobile station notifies quality control means, which is coupled to said network control station and communicates with the mobile stations, of a downlink receiving quality desired by the mobile station and the location of the mobile station, said quality control means determines to which base stations the mobile station is to be connected in order to satisfy the downlink receiving quality by the mobile station and notifies the network control station of the desired base stations to which the mobile station is to be connected, said network control station transmits a duplicated information signal to said desired base stations in order to allow a mobile station to simultaneously communicate with at least two base stations, and said mobile station further receives and synthesizes signals transmitted by the plurality of base stations to control the downlink receiving quality.

5. The receiving quality control method according to claim 4, characterized in that:

before transmitting information, said mobile station notifies said quality control means of a desired uplink receiving quality received by base stations an/or a transmittable maximum power of the mobile station and/or the location of the mobile station, said quality control means identifies base stations to which said mobile station is to be connected in order to satisfy the desired uplink receiving quality in such a manner that the transmittable maximum power of said mobile station is not exceeded, requests the base stations and said network control station to receive and synthesize a signal from the mobile station, and designates transmission power that is to be used by said mobile station, and said mobile station transmits information using the designated transmission power, and said network control section synthesizes signals received by the base stations to control the uplink receiving quality.

6. The receiving quality control method according to claim 4, characterized in that:

said quality control means measures traffic in cells surrounding a cell in which said mobile station is present, and requests said network control station to transmit a duplicate signal to one or more base stations, if any, which have a lower measured traffic and which can transmit information to said mobile station communicating in an adjacent cell, and said mobile station receives and synthesizes signals from base stations that have been communicating with the mobile station and from the one or more base stations, thereby improving the downlink receiving quality.

7. A computer-readable medium having thereon computer-executable instructions representing a receiving quality control program for a mobile communication system, the mobile communication system having a plurality of base stations, a network control station conceptually located above said plurality of base stations and mobile stations receiving signals from said plurality of base stations, the computer-executable instructions being characterized by allowing execution of steps of:

in said mobile station notifying quality control means, which is coupled to said network control station and communicates with the mobile stations, of a downlink receiving quality desired by the mobile stations and the location of the mobile station;

in said quality control means determining to which base stations the mobile station is to be connected in order to satisfy the downlink receiving quality desired by the mobile station and notifying said network control station of the desired base stations to which the mobile station is to be connected;

in said network control station transmitting a duplicated information signal to said desired base stations in order to allow a mobile station to simultaneously communicate with at least base stations; and in said mobile station further receiving and synthesizing signals transmitted by the plurality of base stations to control the downlink receiving quality.

* * * * *

UNITED STATES PATENT AND TRADEMARK OFFICE
CERTIFICATE OF CORRECTION

PATENT NO. : 7,072,655 B2
APPLICATION NO. : 10/054741
DATED : July 4, 2006
INVENTOR(S) : Ikeda et al.

It is certified that error appears in the above-identified patent and that said Letters Patent is hereby corrected as shown below:

Column 4
Line 51, change "is a diagram" to --are diagrams--

Column 5
Line 41, change "bas" to --base--

Column 6
Line 23, change "bas" to --base--
Line 34, after "base stations" insert --must--

Column 10
Line 5, change "an/or" to --and/or--

Signed and Sealed this

Seventeenth Day of April, 2007

JON W. DUDAS
*Director of the United States Patent and Trademark Office*